United States Patent [19]
Abe

[11] Patent Number: 5,872,069
[45] Date of Patent: Feb. 16, 1999

[54] GLASS-CERAMICS FOR MAGNETIC DISC SUBSTRATE, MAGNETIC DISC SUBSTRATE AND MAGNETIC DISC

[75] Inventor: Masahiro Abe, Nagoya, Japan

[73] Assignee: NGK Insulators, Inc., Japan

[21] Appl. No.: 995,257

[22] Filed: Dec. 19, 1997

[30] Foreign Application Priority Data

Dec. 20, 1996 [JP] Japan ................ 8-354627

[51] Int. Cl.$^6$ .................................. C03C 10/04
[52] U.S. Cl. ................ 501/5; 501/4; 428/694 ST
[58] Field of Search ............... 501/4, 5, 63, 68; 428/694 ST

[56] References Cited

U.S. PATENT DOCUMENTS

| | | | |
|---|---|---|---|
| 5,219,799 | 6/1993 | Bealle et al. | 501/5 |
| 5,391,522 | 2/1995 | Goto et al. | 501/4 |
| 5,580,363 | 12/1996 | Goto et al. | 501/4 |
| 5,691,256 | 11/1997 | Taguchi et al. | 501/5 |
| 5,744,208 | 4/1998 | Bealle et al. | 501/5 |

FOREIGN PATENT DOCUMENTS

| | | |
|---|---|---|
| 6329440 | 11/1994 | Japan . |
| 407157331 | 6/1995 | Japan . |
| 408221747 | 8/1996 | Japan . |
| 9035234 | 7/1997 | Japan . |

*Primary Examiner*—Karl Group
*Attorney, Agent, or Firm*—Wall Marjama Bilinski & Burr

[57] ABSTRACT

A novel $Li_2O$—$Al_2O_3$—$SiO_2$ series glass-ceramics for magnetic disc substrate use, which can prevent deformation of the substrate at a large temperature change and provide a strong, small and compact magnetic disc substrate without trouble and much reading and/or writing informations on the smoothened surface of the substrate, is provided. The glass-ceramics has a main crystal phase of lithium disilicate ($Li_2O.2SiO_2$) phase, the peak intensity I of cristobalite phase (CRI) of at least 20 but not more than 50 when the peak intensity of I of lithium disilicate (L2S) phase measured by an X-ray diffraction analysis is taken as 100, and containing 1.0–3.0 parts by weight of $Cr_2O_3$ and 1.0–3.0 parts by weight of MnO when the sum of metal oxides other than $Cr_2O_3$ and MnO is taken as 100 parts by weight.

8 Claims, 3 Drawing Sheets

GLASS-CERAMICS FOR MAGNETIC DISC SUBSTRATE, MAGNETIC DISC SUBSTRATE AND MAGNETIC DISC

BACKGROUND OF THE INVENTION

1. Field of the Invention

The present invention relates to a glass-ceramics for magnetic disc substrates, a magnetic disc substrate and a magnetic disc.

2. Related Art Statement

Recently, a magnetic disc substrate made of glass is practically used in a part of the field of technology. An especially high strength is requested for a magnetic disc substrate for HDD use. Meanwhile, a glass has usually so low strength that it has not a sufficient reliability as a magnetic disc substrate for HDD use. Thus, a tempered glass, such as a chemically tempered glass or a glass ceramics, etc. has to be used. However, if a chemically tempered glass, such as a soda-lime glass, etc. is used as a material for a magnetic disc substrate, alkali metal ions contained in the substrate are likely dissolved out to corrode the magnetic film of the magnetic disc.

Therefore, the inventor has made studies on using a glass-ceramics instead of the chemically tempered glass, as the material for magnetic disc substrate. In a glass-ceramics, almost all the alkali metal ions contained in the glass are existent in the crystal phase of the glass, and only minor amounts of the alkali metal ions are existent in the glass matrix, hence there arises no problem that the alkali metal components constituting the glass ceramics are dissolved out to corrode the magnetic film of the magnetic disc.

Meanwhile, because the chemically tempered glass is wholly composed of an amorphous phase, the surface of the glass can be polished to a center line average surface roughness (Ra) of around 6 Å, if the surface of the glass is subjected to a polishing treatment in order to use the glass as the magnetic disc substrate. To the contrary, the glass-ceramics has a crystal phase and an amorphous phase which have different hardness from each other. Thus, even after subjected to the polishing treatment, the glass-ceramics has unavoidably minute undulations between the crystal phase and the amorphous phase. As a result, it was difficult to suppress the center line average surface roughness (Ra) of the polished surface to 20 Å or less.

In order to solve the disadvantageous problem, the inventor made many studies leading to the present invention to find out that the center line average surface roughness (Ra) of the polished surface after the precise polishing treatment can be reduced to a level of 20 Å or less, if a specific $Li_2O$—$Al_2O_3$—$SiO_2$ series glass-ceramics is used, and concretely disclosed a magnetic disc substrate using the glass-ceramics in the specification of Japanese Patent Application No. 7-174,895.

Even after the disclosure of the finding, there is an increasing demand for recording a large volume of informations, particularly image informations, in a more compact magnetic disc, accompanying with the development of multi-media communication, and a more improved recording density of the magnetic disc has been earnestly desired. As a result, particularly in the reading/writing zone of the magnetic disc, a decreased center line average surface roughness (Ra) of an extent of 10 Å or less has been eagerly desired. Such a desire is extremely difficult to achieve in the magnetic disc substrate consisting of the $Li_2O$—$Al_2O_3$—$SiO_2$ series glass-ceramics. Though the center line average surface roughness (Ra) of an extent of 10 Å or less of the polished surface of the magnetic disc substrate after the precise polishing treatment may be achieved for a non-glass-ceramics or a glass-ceramics of a low crystallization percentage, the strengths of such glasses are relatively low to incur several disadvantages.

For a glass for use as a magnetic disc substrate, there is also a material having a coefficient of thermal expansion of $(80–100) \times 10^{-7}/k$, preferably $(85–90) \times 10^{-7}/k$, at 100°–300° C., which is now used as a practical standard material. This is because the drive shaft that supports the magnetic disc substrate is made of SUS of a coefficient of thermal expansion of $(80–100) \times 10^{-7}/k$ at 100°–300° C. and may cause deformation of the substrate to incur troubles at the time of recording and/or reproducing, if the coefficient of thermal expansion of the substrate greatly differs from that of the drive shaft. Thus, in designing a composition of such a glass, an attention should essentially be paid that the glass may have the coefficient of thermal expansion within the above range.

Also, in the $Li_2O$—$Al_2O_3$—$SiO_2$ series glass-ceramics for magnetic disc substrate use, there is a problem in that a glass can hardly be obtained having a significantly decreased center line average surface roughness (Ra) after a precise polishing treatment of the surface and which is capable of controlling the coefficient of thermal expansion within the range of $(80–100) \times 10^{-7}/k$ at 100°–300° C., while maintaining a desired strength.

The inventor has made many studies and experiments on the $Li_2O$—$Al_2O_3$—$SiO_2$ series glass-ceramics but could hardly solve the above problem for several years. For instance, Japanese Patent Application Laid-open No. 329,440/94 discloses a method of controlling the surface roughness of the $Li_2O$—$Al_2O_3$—$SiO_2$ series glass-ceramics, but the method could not decrease the center line average surface roughness (Ra) to a level of 10 Å or less after a precise polishing treatment of the surface.

Also, the inventor disclosed in Japanese Patent Application No. 174,895/95 (now, published as Japanese Patent Application Laid-open No. 35,234/97) a $Li_2O$—$Al_2O_3$—$SiO_2$ series glass-ceramics having a specific composition. However, even in this glass-ceramics, a glass can hardly be obtained having a significantly decreased center line average surface roughness (Ra) of a level of 10 Å or less, particularly 8 Å or less, after a precise polishing treatment of the surface, while simultaneously controlling the coefficient of thermal expansion within the range of $(80–100) \times 10^{-7}/k$ at 100°–300° C.

Therefore, it is an object of the present invention to provide a $Li_2O$—$Al_2O_3$—$SiO_2$ series glass-ceramics for magnetic disc substrate use having a significantly decreased center line average surface roughness (Ra) after a precise polishing treatment of the surface and which is capable of controlling the coefficient of thermal expansion within the range of $(80–100) \times 10^{-7}/k$ at 100°–300° C., while maintaining a desired strength.

SUMMARY OF THE INVENTION

The invention has made further studies and experiments considering the above viewpoints of technology.

The present invention provides a novel $Li_2O$—$Al_2O_3$—$SiO_2$ series glass-ceramics for magnetic disc substrate use having a main crystal phase of lithium disilicate ($Li_2O.SiO_2$) phase, a peak intensity I of cristobalite phase (CRI) of at least 20 but not more than 50 when the peak intensity of I of lithium disilicate (L2S) phase measured by an X-ray diffraction analysis is taken as 100, and containing 1.0–3.0 parts by weight of $Cr_2O_3$ and 1.0–3.0 parts by weight of MnO when a total sum of metal oxides other than $Cr_2O_3$ and MnO is taken as 100 parts by weight.

The present invention is based on a conclusion of the inventor that the characteristic properties regarding the thermal expansion of the glass-ceramics are largely influenced by types and amounts of crystal phases precipitated in the glass-ceramics and composition and amounts of the amorphous glass phase remaining in the glass-ceramics.

Concretely explaining, in a $Li_2O.Al_2O_3.SiO_2$ series glass-ceramics consisting mainly of lithium disilicate phase, when the lithium disilicate was exclusively precipitated as the main crystal phase, the coefficient of thermal expansion of the glass-ceramics was around $(75-78)\times10^{-7}/k$. In order to bring the coefficient of thermal expansion of this series of glass-ceramics into the range of $(80-100)\times10^{-7}/k$, there is a way of increasing the coefficient of thermal expansion of the amorphous glass phase remaining in the glass-ceramics. For that purpose, a way can be considered of increasing the amount of alkali contents in the amorphous glass phase remaining in the glass-ceramics. However, in such a way, there are disadvantages in that the effect of increasing the coefficient of thermal expansion is not so significantly large and the durability of the magnetic disc is likely deteriorated.

Also, in order to bring the coefficient of thermal expansion of this series of glass-ceramics into the range of $(80-100)\times10^{-7}/k$, there is another way of precipitating a auxiliary crystal phase having a large coefficient of thermal expansion or an auxiliary crystal phase that cause volumetric expansion due to phase transition. In such a case, as the auxiliary crystal phase, crystoballite phase, quartz phase and eucryptite phase, etc. are mentioned.

The inventor selected cristobalite phase among the various auxiliary crystal phases including cristobalite phase, quartz phase and eucryptite phase, etc. in this series of glass-ceramics, and attempted to precipitate the crystoballite phase in this series of glass-ceramics to find out that the proportion ratio of the cristobalite phase existing in the main crystal phase lithium disilicate is much important.

Concretely explaining, it was found out by the inventor that, when the peak intensity I (L2S) of lithium disilicate phase determined by X-ray diffraction analysis is taken as 100, the peak intensity I (CRI) of the cristobalite phase existing in the main crystal phase lithium disilicate should be at least 20 but not more than 50 whereby the coefficient of thermal expansion of this series of glass-ceramics can be controlled within the range of $(80-100)\times10^{-7}/k$.

However, because a considerably large amount of formed cristobalite phase is existing in the glass-ceramics, globular grain made of aggregated particles of crystoballite phase are existing in the structure of the glass-ceramics as described above and have a larger hardness than that of the main crystal phase lithium disilicate. Henceforth, a magnetic disc substrate consisting of such a type of glass-ceramics could not have a decreased center line average surface roughness of a level of 10 Å or less or 8 Å or less even after a precise polishing treatment.

Nevertheless, the inventor made many further studies and experiments leading to the above-described present invention that, in such a glass-ceramics containing a desired amount of precipitated crystoballite phase, the crystal grains of cristobalite phase can be significantly made minute to decrease the center line average surface roughness Ra of the magnetic disc substrate to a level of 10 Å or less or 8 Å or less, when 1.0–3.0 parts by weight of $Cr_2O_3$ and 1.0–3.0 parts by weight of MnO are contained in the glass-ceramics.

BRIEF DESCRIPTION OF THE DRAWING

For a better understanding of the present invention, reference is made to the accompanying drawings, in which.

DETAILED EXPLANATION OF THE INVENTION

Figure 1:
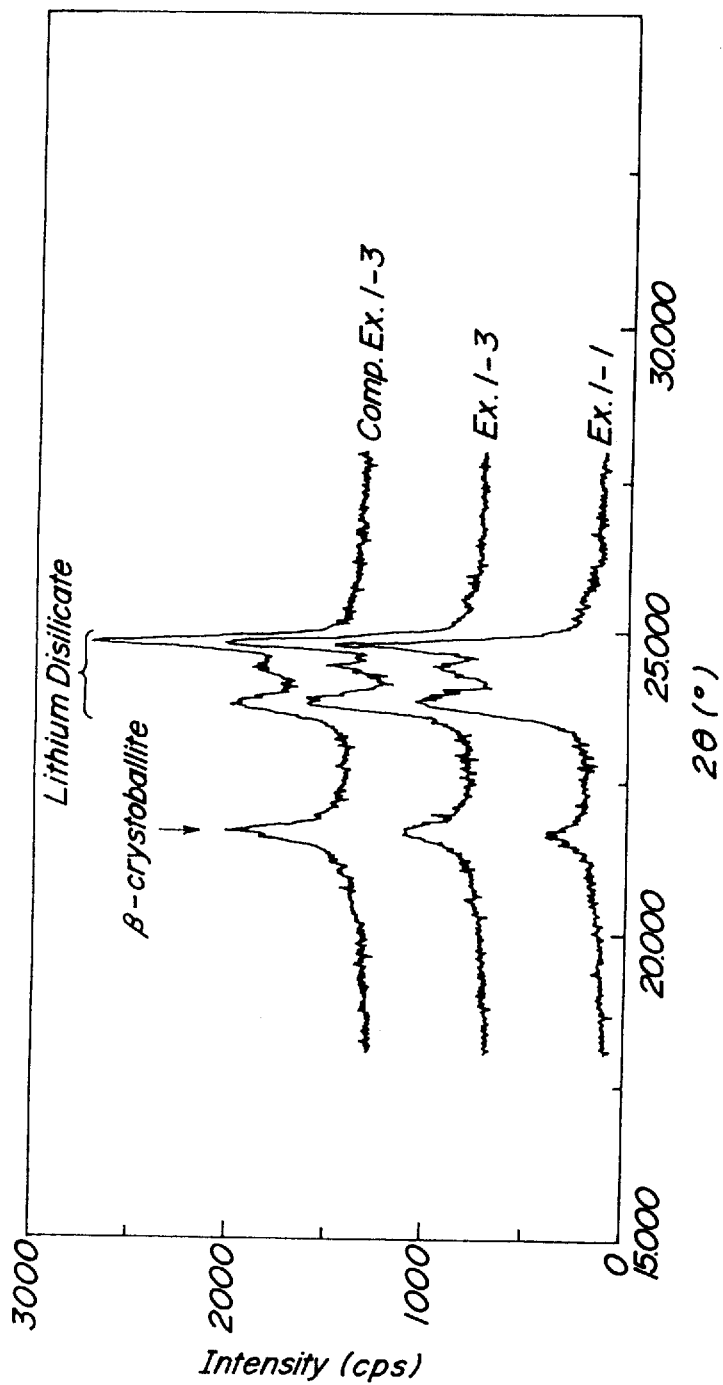
FIG. 1 is a graph of characteristic curves showing results of measurements of respective X-ray diffraction analysis of Examples 1-1 and 1-3 of the present invention and Comparative Example 1-3.

Hereinafter, the present invention will be explained in more detail.

In the present invention, the amount of $Cr_2O_3$ contained in the glass-ceramics is preferably 1.0–2.0 parts by weight. Also, the amount of MnO contained in the glass-ceramics is preferably 1.5–2.5 parts by weight. In such cases, the surface of the magnetic disc substrate can be made much smooth.

Also, the peak intensity I of crystoballite phase (CRI) when the peak intensity of I of lithium disilicate (L2S) phase measured by an X-ray diffraction analysis is taken as 100 is preferably at least 25 but not more than 40. By such an arrangement, the coefficient of thermal expansion of the novel glass-ceramics can be controlled within the range of $(85-90)\times10^{-7}/k$.

In the present invention, the novel $Li_2O.Al_2O_3.SiO_2$ series glass-ceramics is particularly preferable when it has a composition of 70–80 wt % of $SiO_2$, 8–12 wt % of $Li_2O$, 2–8 wt % of $Al_2O_3$, 1–3 wt % of $P_2O_5$ and 1–8 wt % of $ZrO_2$. In such a composition, the above-described amounts of $Cr_2O_3$ and MnO are also receiped.

In case if $ZrO_2$ is not used in this series of glass-ceramics, eucryptite $(Li_2O.Al_2O_3.2SiO_2)$ phase and spodumene $(Li_2O.Al_2O_3.4SiO_2)$ phase are likely formed as the auxiliary phases. However, by the addition of at least 1.0 wt % of $ZrO_2$, both the eucryptite phase and spodumene phase are significantly decreased and microscopically observed aggregated globular grains can not be observed.

When the peak intensity I of lithium disilicate (L2S) phase measured by an X-ray diffraction analysis is taken as 100, the sum of peak intensities of eucryptite phase and spodumene phase by an X-ray diffraction analysis is preferably not more than 50, and more preferably not more than 40.

When subjecting the parent glass to the crystallizing treatment, the maximum temperature in the crystallizing process is preferably 730°–780° C., and more preferably 750°–770° C. If the maximum temperature exceeds 780° C., eucryptite phase, etc. tend to form thereby to increase the Ra after the precise polishing treatment. Also, by using the maximum temperature of at least 730° C., the strength of the glass-ceramics was further improved.

The glass-ceramics of the present invention may sometimes further contain petalite phase, $Al_2O_3$ phase and/or $Li_2O.SiO_2$ phase. When the peak intensity I of lithium disilicate (L2S) phase measured by an X-ray diffraction analysis is taken as 100, the peak intensity of $Al_2O_3$ phase measured by an X-ray diffraction analysis is preferably not more than 50, and the peak intensity of $Li_2O.SiO_2$ phase is preferably not more than 70. Lower limit of the peak intensity of $Al_2O_3$ phase and that of $Li_2O.SiO_2$ phase are 0, respectively. Meanwhile, the glass-ceramics of the present invention substantially does not contain α-quartz and thus α-quartz is not detected by an X-ray diffraction analysis or the peak intensity of α-quartz is not more than 5. Also, the glass-ceramics should preferably has a crystallization percentage of at least 60%.

In the composition of the raw material of the glass-ceramics, $SiO_2$ is an essential fundamental component for obtaining the desired crystal phases including lithium disilicate phase, etc. However, if the amount of $SiO_2$ is less than 70 wt %, the desired crystal phases are hardly precipitated, while if it exceeds 80 wt %, the raw material is hardly melted.

If the amount of $Al_2O_3$ component in the composition exceeds 8 wt %, eucryptite phase is likely excessively formed to decrease the strength of the magnetic disc substrate and increase the center line average surface roughness Ra of the magnetic disc substrate. Therefore, the amount of $Al_2O_3$ component in the composition should be not more than 8 wt %.

If the amount of $ZrO_2$ in the glass-ceramics exceeds 2 wt %, the center line average surface roughness Ra can further be decreased. However, if the amount of $ZrO_2$ exceeds 8 wt %, melting temperature of the parent glass becomes high so that the glass-ceramics is difficult to treat by conventional melting apparatus. From this point of view, the amount of $ZrO_2$ is preferably not more than 6 wt %.

The glass-ceramics of the present invention may further contain another components. For example, $TiO_2$, $SnO_2$ or a fluoride of platinum or other noble metal alone or in admixture of at least two may be contained in the glass-ceramics.

Also, the glass-ceramics of the present invention may further contain 0–7 wt % of $K_2O$ which has effects of lowering the melting temperature and forming temperature of the parent glass and preventing the devitrification of the parent glass at the time of forming the glass. In order to sufficiently exhibit the effect, the content of $K_2O$ is more preferably at least 2 wt %. Meanwhile, if the amount of $K_2O$ exceeds 7 wt %, the strength of the glass-ceramics tends to decrease.

Also, the glass-ceramics of the present invention may further contain a total sum of 0–2 wt % of $As_2O_3$ and/or $Sb_2O_3$ which are refining agents in melting the glass-ceramics. The glass-ceramics of the present invention may further contain 0–3 wt % of $B_2O_3$ component, 0–3 wt % of CaO component, 0–3 wt % of SrO component and/or 0–3 wt % of BaO component.

Preferably, the glass-ceramics substantially does not contain MgO component therein. The expression "substantially does not contain" used herein does not exclude MgO component derived from unavoidable impurities contained in the raw material powders of the other components.

When producing the parent glass, raw material powders each containing the respective metal element are mixed in the above-described weight proportion, and the mixture is melt. As the raw material powders, use may be made of oxides, carbonates, nitrates, phosphates and hydroxides, for example. When crystallizing the parent glass by a heating treatment, the atmosphere of the heating treatment may be selected from air, reducing, steam or pressurized atmosphere, etc.

When heating the parent glass in the above production method, preferably the temperature-elevating rate at the temperature range of at least 500° C. is controlled within the range of 50°–300° C./hr so as to proceed the formation of the crystal nuclei. Preferably, the heated parent glass is maintained at a temperature range of 500°–580° C./hr for at least 1–4 hrs so as to proceed the formation of the crystal nuclei.

In the process of precisely polishing the material consisting of the above-described glass-ceramics with the aid of grinding particles, a publicly known precise polishing process of a so-called lapping, polishing or the like treatment can be used to produce a magnetic disc substrate. The magnetic disc substrate of the present invention can be provided with an under-coating layer, a magnetic layer or a protective layer, etc. on the main surface thereof, and a lubricant may be applied on the protective layer.

DESCRIPTION OF PREFERRED EMBODIMENTS

Hereinafter, the present invention will be explained in more detail with reference to examples.

EXAMPLE 1

(Production of the Glass-ceramics)

Raw material containing respective metal were mixed so as to provide mixtures of the weight proportion ratios of metal oxides as shown in Tables 1 and 2 wherein all the numeral values are expressed by weight % except for $Cr_2O_3$ and MnO. At that time, in all the Examples and Comparative Examples except for Comparative Example 1, the amounts by weight parts of $Cr_2O_3$ and MnO as shown in Tables 1 and 2 were simultaneously mixed together relative to 100 parts by weight of oxides. Then, the mixtures were subjected to a heat treatment at 1,500° C. for 5 hrs to melt the same.

The melts were properly formed and gradually cooled to yield disc shaped parent glass. From the parent glass were cut out plate-shaped specimens of a size of 15 mm×20 mm×0.8 mm and rod-shaped specimens of a size of 3.5 mm×3.5 mm×50 mm. The plate-shaped specimens of the thickness of 0.8 mm were ground on their surfaces by a #400 grinding stone.

Respective specimen was held at 520° C. in nitrogen atmosphere for 1 hr to form crystal nuclei, then heated at a temperature-elevating rate of 100° C./hr to 760° C., held thereat for 4 hrs, and then cooled at a cooling rate of 100° C./hr to perform crystallization.

(X-ray Diffraction Analysis Tests)

An X-ray diffraction apparatus using Kα line of copper ("Geiger flex" produced by Rigaku Denki K. K., tube voltage of 30 kV, tube current of 20 mA) was used to identify the crystal phases formed at the surface of the crystallized plate-shaped specimens having a thickness of 0.8 mm. X-ray diffraction charts of respective glass-ceramics of Examples 1-1 and 1-3 and Comparative Example 1-3 are shown in the attached FIG. 1.

As a result, lithium disilicate ($Li_2O.2SiO$:peak angle 2θ=23.8°, 24.3°, 24.8°) phase was observed as the main crystal phase, and cristobalite phase ($SiO_2$:peak angle 2θ=21.6°) was observed as the auxiliary crystal phase. Though it is considered that petalite ($Li_2O.Al_2O_3.8SiO_2$:peak angle 2θ=23.9°, 24.3°) phase was also formed, the diffraction angles were overlapped with those of lithium disilicate phase so that they were difficult to separately identify.

Though as the cristobalite phase a diffraction peak is observed at the β-phase position which is a high temperature phase, the peak is so broad that an end portion of the peak is extended to the α-phase position 2θ=21.9° which is a low temperature phase.

In the present invention, the peak intensity I of lithium disilicate (L2S) is the diffraction intensity of the main peak (2θ=24.8°) of lithium disilicate, and the peak intensity I of crystoballite phase (CRI) is the diffraction intensity of the peak (2θ=21.6°) of cristobalite phase. The intensity I of CRI when taken the intensity I of L2S is taken as 100 is also shown in Tables 1 and 2 for respective specimen.

(Measurements of Coefficient of Thermal Expansion)

Next, the crystallized rod-shaped specimens of a length of 50 mm were cut to obtain test samples of a length of 40 mm. The test samples were measured on coefficient of thermal expansion by using an apparatus for measuring thermal expansion, "MJ800 CM" produced and sold by Rigaku Denki K. K. The results of the measurement of the thermal expansion of the test samples of Examples 1-1 and 1-3 and Comparative Example 1-3 are shown in the characteristic graphs of the attached FIG. 2. In the measurements the measuring apparatus used a standard temperature of 40° C. Coefficients of thermal expansion α of the test samples of the examples were calculated from a difference between the thermal expansion at 100° C. and the thermal expansion at 300° C. The results are also shown in Tables 1 and 2.

(Measurements of Ra at the Smoothened Surface after the Precise Polishing Treatment)

The crystallized plate-shaped specimens of a thickness of 0.8 mm were subjected to a polishing treatment process using a lapping machine and grinding particles of GC #1000 to a thickness of 0.710 mm. Then, the specimens were polished by using grinding particles of cerium oxide to a thickness of 0.635 mm to obtain glass-ceramics.

The glass-ceramics were measured on the center line average surface roughness Ra at the surface by using a surface roughness meter "Surfcom 900B" of a touch needle type having a 0.5 μm diamond tip end produced and sold by Tokyo Seimitsu k. k. The results are also shown in Tables 1 and 2.

(Test Results)

Figure 2:
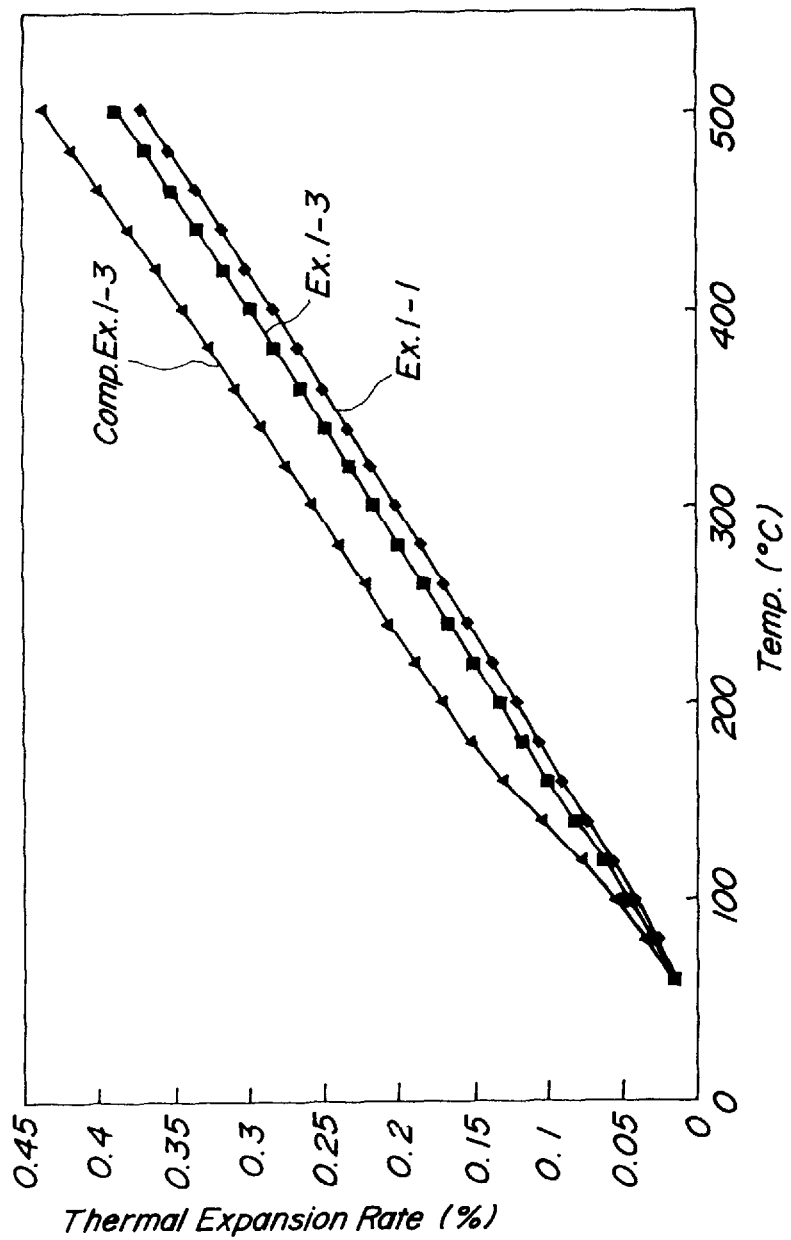
FIG. 2 is a graph of characteristic curves of Examples 1-1 and 1-3 of this series of glass-ceramics of the present invention and Comparative Example 1-3 showing relations between temperature and the thermal expansion.

The characteristic curves of coefficient of thermal expansion of the glass-ceramics have inflections at around 140°–200° C., as seen from FIG. 2. When the peak intensities of β-crystoballite phase of the glass-ceramics measured by an X-ray diffraction analysis were relatively larger, the extents of the inflection of the characteristic curve of thermal expansion of the glass-ceramics became larger, as seen from FIG. 2. Therefore, the inflections of the characteristic curve of thermal expansion of the glass-ceramics are considered due to volumetric expansion caused by phase transition of cristobalite from a α-phase to β-phase in the glass-ceramics.

In Examples 1-1 through 1-3, the content of $Al_2O_3$ was decreased from 5.1 wt % to 4.6 wt % and accompanying therewith the content of $ZrO_2$ was increased. When $Al_2O_3$ was replaced by $ZrO_2$ in this way, accompanying with the increase of the amount of replacing $ZrO_2$, the peak intensity of β-crystoballite phase of the glass-ceramics became large as well as the coefficient of thermal expansion of the glass-ceramics. The similar tendency was observed also in Examples 1-4 through 1-9. As a result, the coefficients of thermal expansion of the glass-ceramics could be controlled within a range of $(80–100)\times10^{-7}$/k.

In Examples 1-1 through 1-9, Ra of the glass-ceramics was not more than 8 Å, though the glass-ceramics contained desired amounts of $Cr_2O_3$ and MnO therein.

In Comparative Examples 1-1 and 1-2, though the peak intensity I (CRI) of the glass-ceramics was not more than 20, the coefficients of thermal expansion of the glass-ceramics

TABLE 1

| Examples | | 1-1 | 1-2 | 1-3 | 1-4 | 1-5 | 1-6 | 1-7 | 1-8 | 1-9 |
|---|---|---|---|---|---|---|---|---|---|---|
| Metal Oxide (wt %) | $SiO_2$ | 76.1 | 76.1 | 76.1 | 76.1 | 76.1 | 76.1 | 76.1 | 76.1 | 76.1 |
| | $Al_2O_3$ | 5.6 | 5.1 | 4.6 | 5.6 | 5.6 | 5.1 | 5.1 | 4.1 | 4.1 |
| | $Li_2O$ | 9.9 | 9.9 | 9.9 | 9.7 | 9.7 | 10.1 | 10.1 | 9.8 | 9.8 |
| | $K_2O$ | 2.8 | 2.8 | 2.8 | 3.0 | 3.0 | 2.8 | 2.8 | 2.9 | 2.9 |
| | $P_2O_5$ | 1.9 | 1.9 | 1.9 | 1.9 | 1.9 | 1.7 | 1.7 | 1.8 | 1.8 |
| | $Sb_2O_3$ | 0.2 | 0.2 | 0.2 | 0.2 | 0.2 | 0.2 | 0.2 | 0.3 | 0.3 |
| | $ZrO_2$ | 3.5 | 4.0 | 4.5 | 3.5 | 3.5 | 4.0 | 4.0 | 5.0 | 5.0 |
| Parts by weight | $Cr_2O_3$ | 1.4 | 1.4 | 1.4 | 1.2 | 1.9 | 1.2 | 1.9 | 1.2 | 1.9 |
| | MnO | 1.6 | 1.6 | 1.6 | 2.0 | 2.0 | 2.2 | 2.2 | 1.8 | 1.8 |
| I (CRI) | | 23 | 30 | 39 | 20 | 33 | 27 | 38 | 42 | 47 |
| α (×10$^{-7}$/k) | | 82 | 86 | 90 | 80 | 84 | 84 | 87 | 93 | 98 |
| Ra (Å) | | 6 | 7 | 8 | 7 | 8 | 7 | 8 | 8 | 8 |

TABLE 2

| Comparative Examples | | 1-1 | 1-2 | 1-3 | 1-4 | 1-5 | 1-6 |
|---|---|---|---|---|---|---|---|
| Metal Oxide (wt %) | $SiO_2$ | 76.1 | 76.1 | 76.1 | 76.1 | 76.1 | 76.1 |
| | $Al_2O_3$ | 7.1 | 6.1 | 3.6 | 5.1 | 5.1 | 5.1 |
| | $Li_2O$ | 9.9 | 9.9 | 9.9 | 9.9 | 9.9 | 9.9 |
| | $K_2O$ | 2.8 | 2.8 | 2.8 | 2.8 | 2.8 | 2.8 |
| | $P_2O_5$ | 1.9 | 1.9 | 1.9 | 1.9 | 1.9 | 1.9 |
| | $Sb_2O_3$ | 0.2 | 0.2 | 0.2 | 0.2 | 0.2 | 0.2 |
| | $ZrO_2$ | 2.0 | 3.0 | 5.5 | 4.0 | 4.0 | 4.0 |
| Parts by weight | $Cr_2O_3$ | 1.2 | 2.2 | 1.4 | 0 | 0.5 | 3.2 |
| | MnO | 1.8 | 1.8 | 1.6 | 0 | 0.5 | 3.2 |
| I (CRI) | | 0 | 10 | 54 | 20 | 24 | 94 |
| α (×10$^{-7}$/k) | | 75 | 76 | 107 | 80 | 83 | 115 |
| Ra (Å) | | 9 | 8 | 10 | 10 | 10 | 9 | were $76\times10^{-7}$/k or $75\times10^{-7}$/k. In Comparative Example 1-3, the peak intensity I (CRI) of the glass-ceramics was 54, then the coefficient of thermal expansion of the glass-ceramics exceeded $100\times10^{-7}$/k. In Comparative Example 1-6, though the peak intensity I (CRI) of the glass-ceramics was 94, the coefficient of thermal expansion of the glass-ceramics exceeded $110\times10^{-7}$/k. From these results it can be seen that the peak intensity I (CRI) of the glass-ceramics should be controlled to not less than 20, preferably at least 25, but not more than 50, in order to control the coefficient of thermal expansion of the glass-ceramics within the desired range of $(80–100)\times10^{-7}$/k.

Next, the glass-ceramics of Example 1-2 and Comparative Example 1-4 after the above-described precise polishing treatment were subjected at the respective surface to an etching treatment in an aqueous solution of 5% hydrofluoric acid for 3 min, and thereafter observed by a scanning electron microscope (SEM). The results are shown in the attached FIGS. 3 and 4.

When compared the glass-ceramics containing $Cr_2O_3$ and MnO of Example 1-2 with the glass-ceramics not containing $Cr_2O_3$ and MnO of Comparative Example 1-4, the peak intensities I of crystoballite phase and coefficients of thermal expansion are substantially the same. However, the microstructures observed by SEM and the surface roughness Ra after the precise polishing treatment differed from each other.

Figure 3:
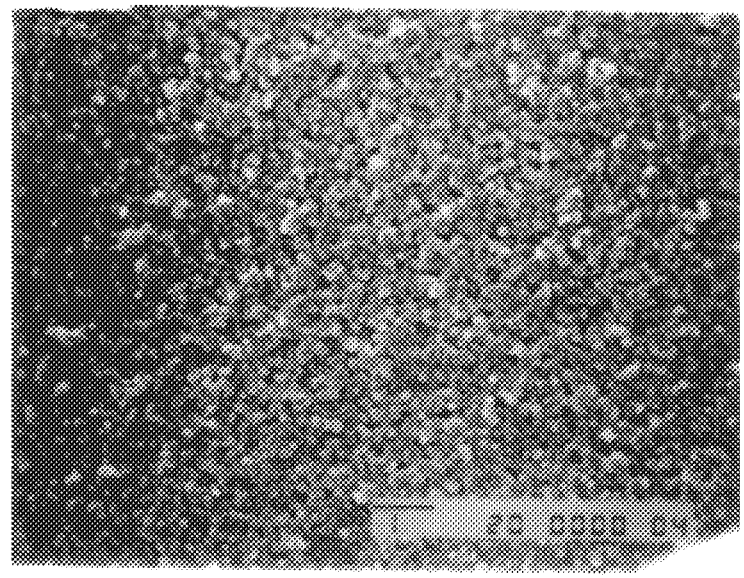
FIG. 3 is a photograph of the surface of the ceramics structure of Example 1-1 after etching of a precise polishing treatment, taken by a scanning electron microscope.
Figure 4:
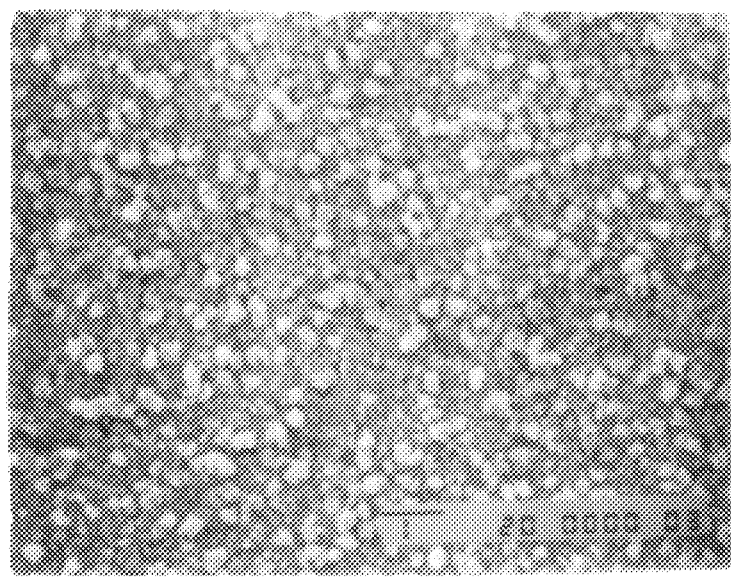
FIG. 4 is a photograph of the surface of the ceramics structure of Comparative Example 1-1 after etching of a precise polishing treatment, taken by a scanning electron microscope.

Namely, though crystal grains of crystoballite phase of globular shape of a diameter of 0.5 μm at the maximum were observed as seen from FIG. 4 in the glass-ceramics of Comparative Example 1-4, crystal grains of crystoballite phase of particulate shape of Example 1-2 were minutely fine of a diameter of 0.2 μm at the maximum and crystal grains were finely distributed in the glass-ceramics as seen from FIG. 3. Such a difference between the precipitated states of crystal grains is considered to have reflected to the difference between the surface roughnesses of the glass-ceramics after the precise polishing treatment.

As seen from Comparative Example 1-5, the effect of containing $Cr_2O_3$ and MnO is not sufficient if the amounts of $Cr_2O_3$ and MnO are respectively 0.5 part by weight. Also, as seen from Comparative Example 1-6, if the amounts of $Cr_2O_3$ and MnO are respectively 3.2 parts by weight, the amount of precipitated crystoballite phase became excessively large to cause the coefficients of thermal expansion larger than the range of the desired values. Therefore, the $Cr_2O_3$ content should be within the range of 1.0–3.0 parts by weight, and more preferably within the range of 1.0–2.0 parts by weight. Also, the MnO content should be within the range of 1.0–3.0 parts by weight, and more preferably within the range of 1.5–2.5 parts by weight.

(Bending Strength and Hardness Test)

From the test sample of Example 1-1 after the precise polishing treatment was cut out a test sample of a size of 2 mm×18 mm for testing a bending strength. The test was carried out based on the method of Japanese Industrial Standard (JIS) 1601 to obtain a bending strength of 220 MPa. Also, Knoop hardness of the surface of the test sample was measured under a pressing load of 500 gf to obtain a value of 675.

EXAMPLE 2

In the same manner as in Example 1, test samples of glass-ceramics were prepared wherein the weight proportions of respective oxide were selected to those values as shown in the Table 3.

Then, in the same manner as in Example 1, the peak intensity I (CRI) and coefficient of thermal expansion (a) of the glass-ceramics and the center line average surface roughness Ra after the precise polishing treatment were measured. The results are shown in the following Table 3.

TABLE 3

|  |  | Examples | | Comparative Example |
|---|---|---|---|---|
|  |  | 2-1 | 2-2 | 2-1 |
| Metal Oxide (wt %) | $SiO_2$ | 77.1 | 77.6 | 78.6 |
|  | $Al_2O_3$ | 6.1 | 5.6 | 4.6 |
|  | $Li_2O$ | 9.6 | 9.6 | 9.6 |
|  | $K_2O$ | 3.0 | 3.0 | 3.0 |
|  | $P_2O_5$ | 2.0 | 2.0 | 2.0 |
|  | $Sb_2O_3$ | 0.2 | 0.2 | 0.2 |
|  | $ZrO_2$ | 2.0 | 2.0 | 2.0 |
| Parts by weight | $Cr_2O_3$ | 1.5 | 1.5 | 1.5 |
|  | MnO | 1.5 | 1.5 | 1.5 |
| I (CR1) |  | 25 | 30 | 58 |
| α ($\times10^{-7}$/k) |  | 84 | 88 | 110 |
| Ra (Å) |  | 8 | 8 | 10 |

In Example 2, a portion of $Al_2O_3$ was replaced by $SiO_2$. In Example 2-1, the peak intensity I (CRI) was 25 and the coefficient of thermal expansion was $84\times10^{-7}$/k. In Example 2-2, $SiO_2$ content was increased as compared with that of Example 2-1 thereby the peak intensity I (CRI) was increased to 30. In Example 2-2, the coefficient of thermal expansion was $88\times10^{-7}$/k. Both the Examples 2-1 and 2-2 had a center line average surface roughness Ra of 8 Å after the precise polishing treatment.

In Comparative Example 2-1, the amount replaced by $SiO_2$ is further larger than that in Example 2-2 thereby the peak intensity I (CRI) was increased to 58 and the coefficient of thermal expansion was reached to $110\times10^{-7}$/k.

EXAMPLE 3

In the same manner as in Example 1, parent glasses were produced. In the parent glasses, the weight proportion ratios of respective oxide were selected so as to be the same with those of Examples 1-2 shown in Table 1. From the parent glasses were cut out plate-shaped specimens of a size of 15 mm×20 mm×0.8 mm(thickness) and rod-shaped specimens of a size of 3.5 mm×3.5 mm×50 mm. The plate-shaped specimens of the thickness of 0.8 mm were ground on their surfaces by a #400 grinding stone.

Respective specimen was held at 520° C. in nitrogen atmosphere for 1 hr to form crystal nuclei, then heated at a temperature-elevating rate of 100° C./hr to respective crystallizing temperature as shown in Table 4, held thereat for 4 hrs, and then cooled at a cooling rate of 100° C./hr to perform crystallization.

Then, in the same manner as in Example 1, the peak intensity I (CRI) and the coefficient of thermal expansion α of the glass-ceramics and the center line average surface roughness Ra after the precise polishing treatment were measured. The results are shown in the following Table 4.

TABLE 4

|  | Examples | | | Comparative Example |
| --- | --- | --- | --- | --- |
|  | 3-1 | 3-2 | 3-3 | 3-1 |
| Crystallization Temperature (°C.) | 730 | 740 | 770 | 790 |
| I (CR1) | 22 | 27 | 40 | 54 |
| α (×10$^{-7}$/k) | 82 | 85 | 88 | 106 |
| Ra (Å) | 7 | 7 | 8 | 12 |

Accompanying with the increase of the crystallizing temperature from 730° C. towards 790° C., the peak intensity I (CRI) was increased. At the crystallizing temperature of 770° C. or more, the peak intensity I (CRI) of the crystoballite phase was not changed substantially but precipitation of the β-eucryptite phase was observed and the surface roughness Ra after the final polishing treatment was worse. Therefore, the crystallizing temperature is preferably not less than 730° C. but not more than 780° C., and more preferably not less than 740° C. but not more than 770° C.

EXAMPLE 4

In the same manner as described in Example 1, test samples made of glass-ceramics of the composition of Example 1-2 were prepared. At that time, metal oxides each of respective amount as shown in the following Table 5 relative to 100 parts by weight of the raw material oxides were simultaneously mixed and melted to incorporate the metal oxides of Table 5 into the glass-ceramics.

Then, in the same manner as in Example 1, the peak intensity I (CRI) and the coefficient of thermal expansion α of the glass-ceramics and the center line average surface roughness Ra after the precise polishing treatment were measured. The results are shown in the following Table 5.

TABLE 5

| Examples | 4-1 | 4-2 | 4-3 |
| --- | --- | --- | --- |
| Simultaneously added oxide | CoO | Fe$_2$O$_3$ | NiO |
| Amount of added oxide (parts by weight) | 0.2 | 0.2 | 2.0 |
| I (CR1) | 30 | 29 | 36 |
| α (×10$^{-7}$/k) | 85 | 85 | 89 |
| Ra (Å) | 7 | 7 | 8 |

As seen from Table 5, the advantageous functions and effects of the present invention brought from the addition of Cr$_2$O$_3$ and MnO were obtained even with regard to Examples 4-1, 4-2 and 4-3 wherein CoO, Fe$_2$O$_3$ or NiO was incorporated into the glass-ceramics of the composition of Example 1-2. Therefore, simultaneously with Cr$_2$O$_3$ and MnO another metal oxides can be incorporated in the glass-ceramics so far as the metal oxides do not incur an adverse influence on the characteristic properties of the glass-ceramics. However, with the increase of the amount of the another metal oxides, the β-eucryptite phase was formed and the surface roughness Ra after the precise polishing treatment became worse. Therefore, when the summed amount of metal oxides other than CoO, Fe$_2$O$_3$ and NiO was taken as 100 parts by weight, the summed amount of CoO, Fe$_2$O$_3$ and NiO is preferably not more than 3 parts by weight, more preferably not more than 2 parts by weight.

As explained in detail in the foregoing explanations, the present invention can provide a novel Li$_2$O—Al$_2$O$_3$—SiO$_2$ series glass-ceramics for magnetic disc substrate use which has a significantly decreased center line average surface roughness Ra after precise polishing treatment of the glass-ceramics surface and a controlled coefficient of thermal expansion of (80–100)×10$^{-7}$/k at 100°–300° C., while maintaining a desired strength.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A Li$_2$O—Al$_2$O$_3$—SiO$_2$ series glass-ceramics for magnetic disc substrate use, which has a main crystal phase of lithium disilicate (Li$_2$O.2SiO$_2$) phase, the peak intensity I (CRI) of cristobalite phase of at least 20 but not more than 50 when the peak intensity of I of lithium disilicate (L2S) phase measured by an X-ray diffraction analysis is taken as 100, and containing 1.0–3.0 parts by weight of Cr$_2$O$_3$ and 1.0–3.0 parts by weight of MnO when the sum of metal oxides other than Cr$_2$O$_3$ and MnO is taken as 100 parts by weight.

2. The glass-ceramics for magnetic disc substrate use as defined in claim 1, wherein the amount of Cr$_2$O$_3$ is 1.0–2.0 parts by weight and the amount of MnO is 1.5–2.5 parts by weight.

3. The glass-ceramics for magnetic disc substrate use as defined in claim 1, wherein the peak intensity I of cristobalite phase (CRI) is at least 25 but not more than 40 when the peak intensity I of lithium disilicate (L2S) phase measured by an X-ray diffraction analysis is taken as 100.

4. The glass-ceramics for magnetic disc substrate use as defined in claim 1, further containing, in addition to Cr$_2$O$_3$ and MnO, 70–80 wt % of SiO$_2$, 8–12 wt % of Li$_2$O, 2–8 wt % of Al$_2$O$_3$, 1–3 wt % of P$_2$O$_5$ and 1–8 wt % of ZrO$_2$.

5. The glass-ceramics for magnetic disc substrate use as defined in claim 4, wherein the sum of the amounts of at least one metal oxide selected from the group consisting of CoO, Fe$_2$O$_3$ and NiO is not more than 3 parts by weight when the sum of the amounts of the metal oxide other than CoO, Fe$_2$O$_3$ and NiO is taken as 100 parts by weight.

6. The glass-ceramics for magnetic disc substrate use as defined in claim 1, which has a coefficient of thermal expansion of (80–100)×10$^{-7}$/k at 100°–300° C.

7. A magnetic disc substrate made of the glass-ceramics of claim 1, which has a smoothened surface of a center line average surface roughness Ra of not more than 8 Å.

8. A magnetic disc comprising the magnetic disc substrate of claim 7, which has an under-coating layer formed on the smoothened surface, and a magnetic metal layer formed on the under-coating layer.

* * * * *